(12) United States Patent
Husson

(10) Patent No.: US 8,678,477 B2
(45) Date of Patent: Mar. 25, 2014

(54) UTILITY VEHICLE CAB SUSPENSION

(75) Inventor: Geoffroy Husson, Beauvais (FR)

(73) Assignee: AGCO SA, Beauvais (FR)

( * ) Notice: Subject to any disclaimer, the term of this patent is extended or adjusted under 35 U.S.C. 154(b) by 0 days.

(21) Appl. No.: 13/500,080

(22) PCT Filed: Oct. 4, 2010

(86) PCT No.: PCT/EP2010/064745
§ 371 (c)(1),
(2), (4) Date: Apr. 4, 2012

(87) PCT Pub. No.: WO2011/042390
PCT Pub. Date: Apr. 14, 2011

(65) Prior Publication Data
US 2012/0193941 A1 Aug. 2, 2012

(30) Foreign Application Priority Data
Oct. 5, 2009 (GB) .................................. 0917361.8

(51) Int. Cl.
*B62D 33/067* (2006.01)
*B62D 33/10* (2006.01)

(52) U.S. Cl.
USPC ............... 296/190.04; 296/190.07; 180/89.14

(58) Field of Classification Search
USPC .......... 296/190.04–190.07; 180/89.13, 89.14; 280/6.154
See application file for complete search history.

(56) References Cited

U.S. PATENT DOCUMENTS

| 3,201,141 A | 8/1965 | Bernstein et al. |
| 4,330,149 A | 5/1982 | Salmon |
| 4,438,970 A | 3/1984 | Boucher |
| 6,343,799 B1 * | 2/2002 | Moyer ....................... 280/6.154 |
| 6,758,294 B2 * | 7/2004 | Peddycord et al. ........ 180/89.12 |
| 7,300,100 B2 * | 11/2007 | McLean et al. .......... 296/190.07 |
| 2007/0056787 A1 | 3/2007 | Haeusler et al. |

FOREIGN PATENT DOCUMENTS

| GB | 836511 A | 6/1960 |
| GB | 1343742 A | 1/1974 |
| GB | 2338689 A | 12/1999 |

OTHER PUBLICATIONS

Interntaional Search Report for International Application No. PCT/EP2010/064745 Dated Mar. 15, 2011.
Great Britian Search Report for Great Britian Application No. GB0917361.8 Dated Jan. 6, 2010.

* cited by examiner

*Primary Examiner* — Dennis Pedder

(57) ABSTRACT

A utility vehicle (10) comprising a cab (12) mounted to a frame (14) by cab suspension means (16) is provided. The cab suspension comprises rolling linkage (20) which permits only circumferential movement of the cab around a generally longitudinal axis (24;44), and vertical linkage (22) which permits only radial movement of the cab relative to said axis (24) or radial movement of the axis (44) relative to the frame. The rolling linkage and vertical linkage are connected in series between the cab and the frame thus allowing independent resolution of rolling movement and vertical movement. The cab suspension means further comprises two spring/dampers (28,38; 58,38) arranged to independently control the stiffness and damping within the two degrees of freedom, namely roll and vertical movement.

3 Claims, 3 Drawing Sheets

UTILITY VEHICLE CAB SUSPENSION

BACKGROUND OF THE INVENTION

1. Field of Invention

The invention relates to utility vehicle cab suspensions which serve to mount a cab to a vehicle frame.

2. Description of Related Art

In recent years utility vehicle cab suspensions have developed to improve driver comfort significantly. Typically such vehicles are driven over rough terrain which imparts transverse, longitudinal and vertical forces upon the vehicle frame. These forces are transmitted to the cab and thus the driver unless absorbed by the intervening cab suspension system. Modern cab suspensions seek to decrease the accelerations experienced by the driver in the form of vibration and bumps so as to increase the comfort for the driver. However, there still remains the desire to improve cab suspension mechanisms further.

OVERVIEW OF THE INVENTION

In accordance with the invention there is provided a utility vehicle comprising a cab mounted to a frame by cab suspension means which comprises rolling linkage which permits only circumferential movement of the cab around a generally longitudinal axis, and vertical linkage which permits only radial movement of the cab relative to said axis or radial movement of the axis relative to the frame, the cab being mounted to one of the rolling linkage and vertical linkage which, in turn, is connected to the frame via the other of the rolling linkage and vertical linkage, the cab suspension means further comprising a first spring/damper connected between the frame and said other of the rolling linkage and vertical linkage, and a second spring/damper connected between the rolling linkage and vertical linkage.

Suspended cabs can move with several degrees of freedom. The invention involves the recognition that existing cab suspension systems employ spring/damper elements which act upon more than one degree of freedom. The linkage employed in some existing cab suspension systems permits the cab to move both vertically and roll from side to side. The dampers employed in conjunction with such linkage control both the roll and vertical oscillations therefore requiring a compromise over the control over each degree of freedom. Advantageously, the cab suspension means of the invention employs separate mechanical linkage for rolling movement and vertical movement. This enables independent control of each degree of freedom.

The cab suspension means includes a vertical linkage and a rolling linkage connected mechanically in series between the frame and the cab. This permits rolling and vertical movement to be resolved independently. In conjunction with the linkage, two spring/damper elements are employed to independently control the roll and vertical movement. Therefore the roll stiffness and roll damping does not depend on the vertical stiffness and vertical damping as with existing systems. Advantageously, the invention has particular application in semi-active and active suspension systems. For example, during a turn of the vehicle the roll damping can be increased without changing the vertical damping. This can be contrasted to existing systems wherein the damping for these two degrees of freedom are inextricably linked.

In a first preferred embodiment the cab is mounted to the vertical linkage which is connected to the frame via the rolling linkage, and the first spring damper is connected between the frame and the rolling linkage. In this case the vertical linkage permits only radial movement of the cab relative to said axis.

In a second preferred embodiment the cab is mounted to the rolling linkage which is connected to the frame via the vertical linkage and the first spring damper is connected between the frame and the vertical linkage. In this case the vertical linkage permits only radial movement of the axis relative to the frame.

Preferably the vertical linkage comprises a pair of lateral arms connected in a four link suspension arrangement either between the rolling linkage and the cab or between the rolling linkage and the frame.

BRIEF DESCRIPTION OF THE DRAWINGS

Further advantages of the invention will become apparent from reading the following description of specific embodiments with reference to the appended drawings in which:—

DETAILED DESCRIPTION OF THE INVENTION

Figure 1:
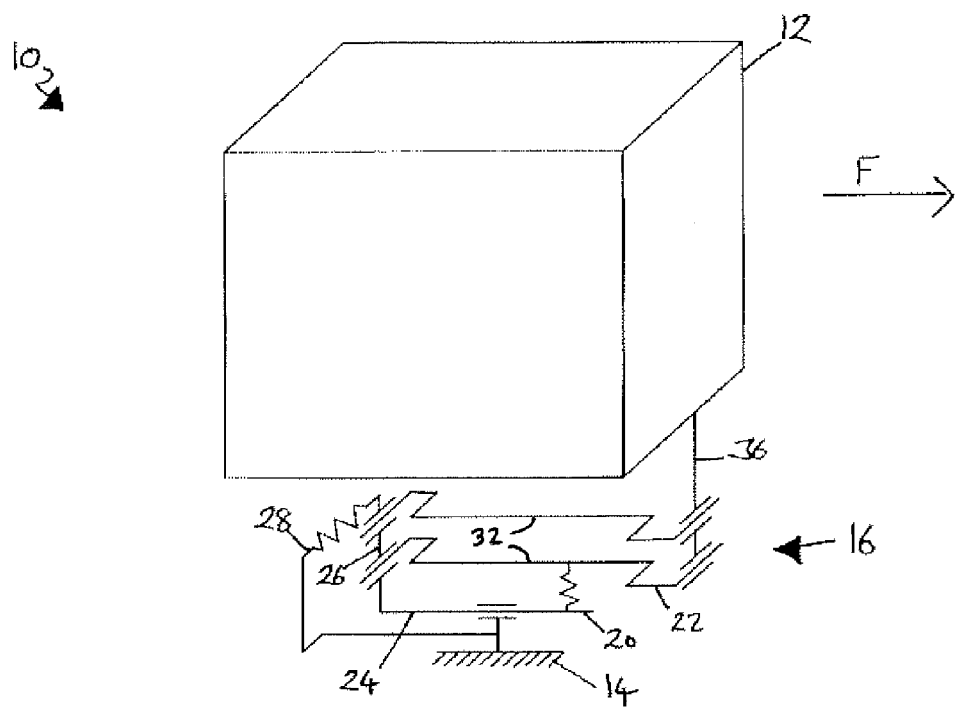
FIG. 1 is a highly schematic perspective view of a utility vehicle in accordance with a first embodiment of the invention.
Figure 2:
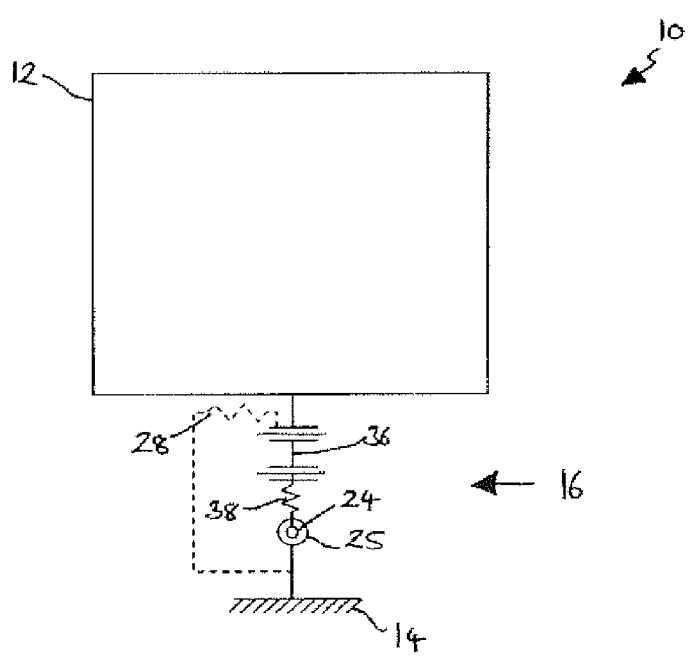
FIG. 2 is a front view of the utility vehicle shown in FIG. 1.
Figure 3:
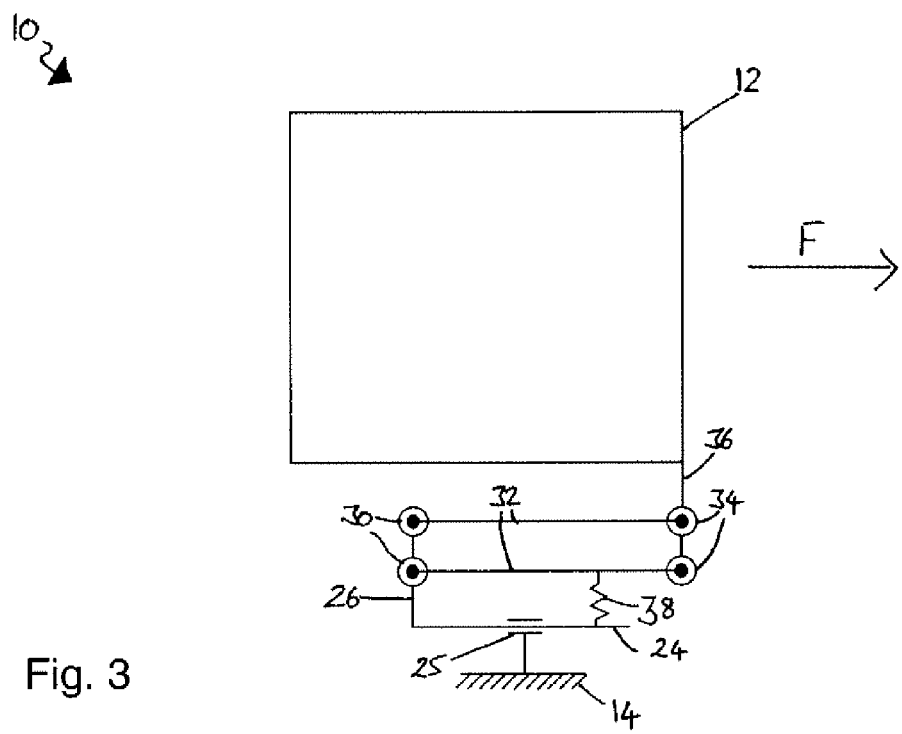
FIG. 3 is a side view of the utility vehicle of FIG. 1.

With reference to FIGS. 1, 2 and 3 part of an agricultural tractor is shown in highly schematic form. The invention relates particularly to the cab suspension which is illustrated whilst other common features such as wheels and the transaxle are not represented. It should be recognised that the invention can be applied to various types of utility vehicle, particularly those which operate over rough terrain and benefit from improved cab suspension. Although particularly suitable for agricultural tractors the following description can equally apply to plant machinery, field sprayers and even heavy goods vehicles.

The tractor 10 comprises a cab 12 mounted to a frame 14 by a cab suspension assembly designated generally by 16. As with known cabs, the cab 12 includes a driver's space, a steering wheel and other user interface devices (not shown). Appropriate connection of the steering controls and various electronic interface devices are made to other parts of the vehicle.

Although represented highly schematically, the frame 14 typically is provided by a chassis or transaxle which houses the vehicle transmission for example. Typically the axles (not shown) are mounted to the frame 14 via suspension or otherwise.

The cab suspension means 16 comprises a rolling linkage assembly 20 and a vertical linkage assembly 22. The rolling linkage assembly 20 comprises a longitudinal shaft 24 which is held in position relative to the frame 14 by joint 25 which permits rotation of the shaft 24 around its own axis.

It should be understood that the term 'longitudinally' is made with reference to the normal direction of travel indicated by arrow F in FIGS. 1 and 3. The term 'longitudinally' implies a direction parallel to the normal direction of travel whilst the term 'transverse' implies a direction to the left and right of the normal direction of travel.

To one end of the shaft 24 an upright shaft 26 is connected so as to be aligned radially with respect to shaft 24. A first spring/damper element 28 is connected between the upright shaft 26 and frame 14 as indicated schematically in FIG. 1. The first spring/damper element 28 serves to control the roll stiffness and roll damping as will be described in more detail below.

The shaft 26 includes a pair of joints, for example in the form of bushes 30, as best shown in FIG. 3. One end of each of a pair of lateral arms 32 is connected to a respective joint 30 whilst the other end of each arm 32 is connected to another pair of joints 34 which are fixed with respect to cab 12 by a vertical member 36. The lateral arms 32 are spaced in a parallel relationship and extend generally longitudinally from the first pair of joints 30 to the second pair of joints 34. Together with the joints 30, 34 and upright shafts 26,36, the lateral arms 32 provided a four-link suspension arrangement wherein each end of both arms is free to pivot around a respective generally transverse axis at each joint. The four-link suspension arrangement permits radial movement of the cab 12 with respect to the axis defined by longitudinal shaft 24.

A second spring/damper element 38 is connected between the lower arm 32 of the vertical linkage and the longitudinal shaft 24 of the rolling linkage 20. The second spring/damper element 38 controls the stiffness and damping of the radial movement described above. It should be appreciated that when the cab has zero roll displacement, that is when the cab is upright, the radial movement permitted by the vertical linkage 22 equates to vertical movement of the cab 12 relative to the frame 14.

It can be seen from FIGS. 1 to 3 that the series arrangement of the rolling linkage 20 and vertical linkage 22 permit two degrees of freedom of movement of cab 12 in an independent manner. Each degree of freedom, that is roll and vertical displacement, has an associated spring/damper element 28,38. This enables the stiffness and damping for each degree of freedom to be controlled independently. For example, the stiffness of the cab rolling motion may be controlled without affecting the stiffness of the vertical movement. Advantageously, this increases flexibility when designing semi-active and active suspension systems.

Figure 4:
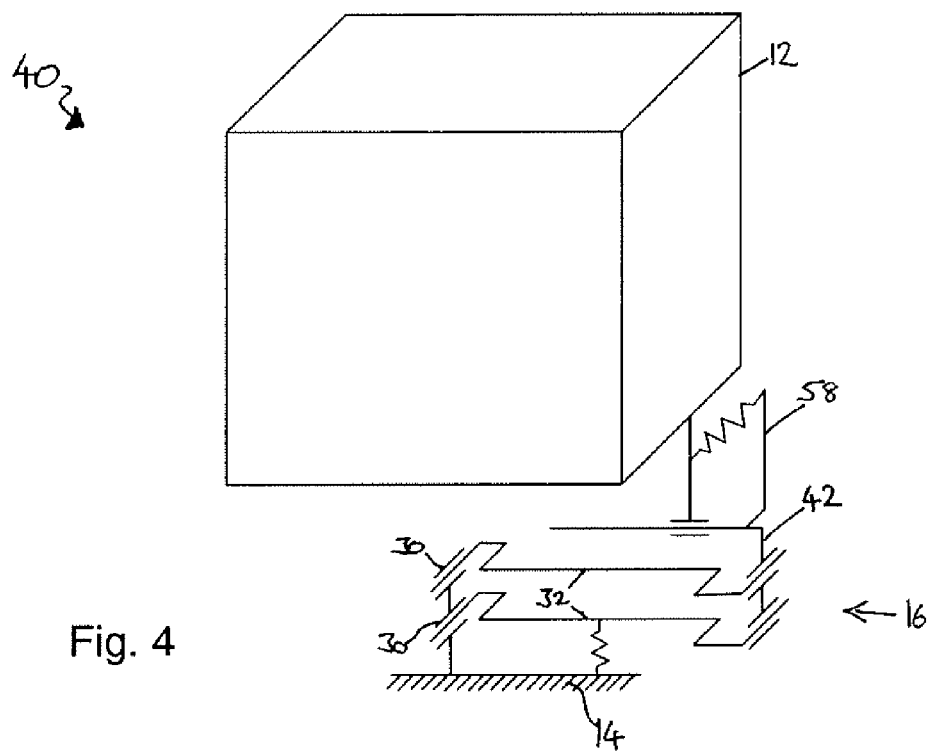
FIG. 4 is a highly schematic perspective view of a utility vehicle in accordance with a second embodiment of the invention.
Figure 5:
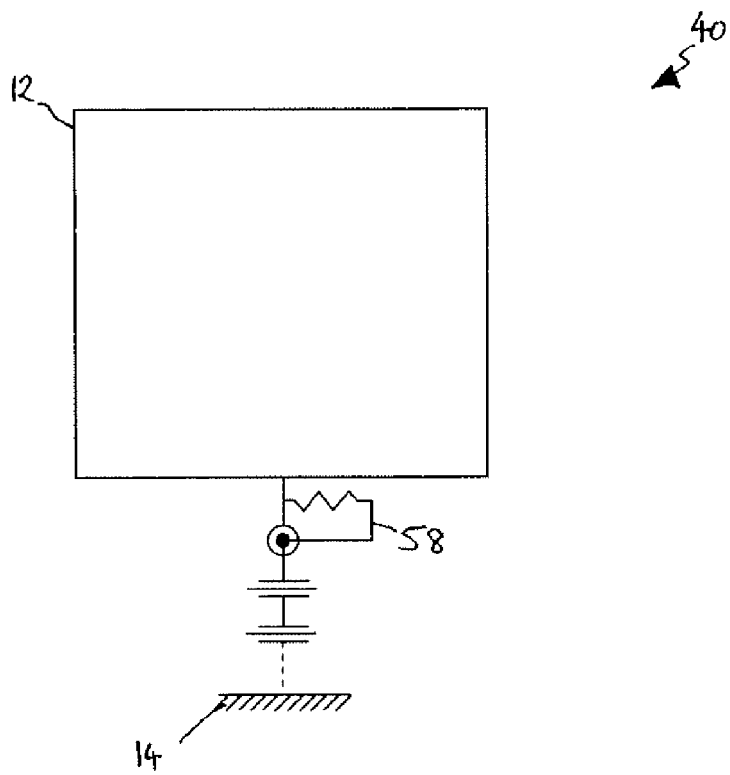
FIG. 5 is a front view of the utility vehicle of FIG. 4.
Figure 6:
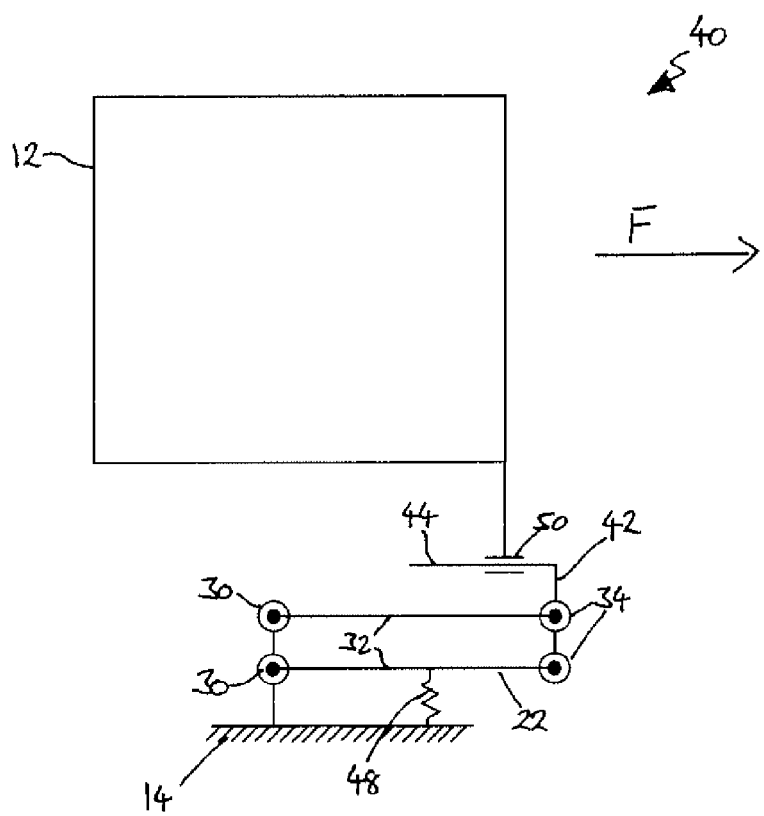
FIG. 6 is a side view of the utility vehicle of FIG. 4.

With reference now to FIGS. 4, 5 and 6, a tractor 40 includes an alterative arrangement for the cab suspension 16 described above. Features which equate to those described above with relation to FIGS. 1,2 and 3 will adopt the same reference numeral.

In principle the rolling linkage 20 and vertical linkage 22 described above are reversed in their series arrangement to provide the cab suspension 16 shown in FIGS. 4, 5 and 6. In short, the cab 12 is mounted to the rolling linkage 20 which is connected to the frame 14 via the vertical linkage 22.

In more detail, one end of each of a pair of lateral arms 32 is pivotally mounted to a respective one of a pair of joints 30 which are fixed in position relative to frame 14. In a similar manner to above the vertical linkage further comprises a second pair of joints 34 which provide a pivotal mounting point for the other end of each lateral arm 32. The vertical linkage 22 therefore comprises a four-link suspension arrangement which permits vertical movement, that is up and down, of an upright shaft 42. Connected to the upper end of upright shaft 42 is a longitudinal shaft 44 which also forms part of the vertical linkage 22. A first spring/damper element 48 is connected between the lower arm 32 and the frame 14 to control stiffness and damping of the vertical movement.

The cab 12 is mounted to the longitudinal shaft 44 via joint 50 which permits circumferential movement of the cab 12 around an axis defined by shaft 44. Joint 50 effectively provides the rolling linkage which moves relative to the vertical linkage 22. The roll stiffness and damping is controlled by a second spring damper element 58 as shown in FIGS. 4 and 5.

In the same vein as the embodiment described with reference to FIGS. 1,2 and 3, this alternative arrangement also permits independent control of the roll and vertical movement of the cab 12 and thus delivers the aforementioned advantages.

Although shown in a highly simplified manner the elements of the described cab suspension can be formed from a number of known components without the exercise of any inventive effort. For example the pivotal joints provided by the four-link suspension arrangement may be provided by universal joints or simple shafts which rotate within a supported bush. Moreover the spring/damper elements may be provided by a number of different known components such as pressurised pneumatic cylinders or simple mechanical springs.

The invention claimed is:

1. A utility vehicle comprising a cab mounted to a frame by cab suspension means which comprises a rolling linkage which permits only circumferential movement of the cab around a generally longitudinal axis, and a vertical linkage which permits only radial movement of the cab relative to said axis or radial movement of the axis relative to the frame, the cab being mounted to one of the rolling linkage and the vertical linkage which, in turn, is connected to the frame via the other of the rolling linkage and the vertical linkage, the cab suspension means further comprising a first spring/damper connected between the frame and said other of the rolling linkage and the vertical linkage, and a second spring/damper connected between the rolling linkage and the vertical linkage, wherein the vertical linkage comprises a pair of lateral aims connected in a four-link suspension arrangement either between the rolling linkage and the cab or between the rolling linkage and the frame.

2. A utility vehicle according to claim 1, wherein the cab is mounted to the rolling linkage which is connected to the frame via the vertical linkage, and the first spring damper is connected between the frame and the vertical linkage.

3. A utility vehicle according to claim 1, wherein the cab is mounted to the vertical linkage which is connected to the frame via the rolling linkage, and the first spring damper is connected between the frame and the rolling linkage.

* * * * *